(12) United States Patent
Brown

(10) Patent No.: US 7,677,746 B2
(45) Date of Patent: Mar. 16, 2010

(54) ILLUMINATION DEVICE

(75) Inventor: David Brown, Oslo (NO)

(73) Assignee: Tandberg Telecom AS, Lysaker (NO)

( * ) Notice: Subject to any disclaimer, the term of this patent is extended or adjusted under 35 U.S.C. 154(b) by 188 days.

(21) Appl. No.: 11/554,403

(22) Filed: Oct. 30, 2006

(65) Prior Publication Data

US 2007/0121343 A1    May 31, 2007

(30) Foreign Application Priority Data

Nov. 1, 2005    (NO) .................................. 20055111

(51) Int. Cl.
*F21V 19/02* (2006.01)
(52) U.S. Cl. ........................... 362/85; 362/355; 362/11; 362/427; 362/800; 362/285
(58) Field of Classification Search ................. 362/341, 362/345, 355, 356, 11, 16, 18, 622, 613, 362/8, 427, 428, 418, 85, 276, 277, 285, 362/287
See application file for complete search history.

(56) References Cited

U.S. PATENT DOCUMENTS

| 6,749,310 | B2* | 6/2004 | Pohlert et al. ................. 362/11 |
| 6,824,283 | B2* | 11/2004 | Pohlert et al. ................. 362/11 |
| 7,036,946 | B1* | 5/2006 | Mosier ......................... 362/27 |
| 7,213,958 | B2* | 5/2007 | Ouderkirk et al. ........... 362/609 |
| 7,309,965 | B2* | 12/2007 | Dowling et al. ............. 315/318 |
| 2002/0015020 | A1 | 2/2002 | Mobin |
| 2003/0117798 | A1 | 6/2003 | Leysath |
| 2003/0151658 | A1 | 8/2003 | Smith |
| 2003/0156416 | A1 | 8/2003 | Stopa et al. |
| 2004/0027820 | A1* | 2/2004 | Hilmersen .................... 362/8 |
| 2004/0047152 | A1 | 3/2004 | Hung et al. |
| 2004/0070991 | A1 | 4/2004 | Agabekov et al. |
| 2004/0190282 | A1 | 9/2004 | Hussaini et al. |
| 2005/0063185 | A1 | 3/2005 | Monjo et al. |
| 2006/0139953 | A1* | 6/2006 | Chou et al. ................. 362/613 |

FOREIGN PATENT DOCUMENTS

| DE | 35 04 316 A1 | 8/1986 |
| DE | 696 05 229 T2 | 7/2000 |
| DE | 203 10 780 U1 | 1/2004 |
| DE | 20 2004 004 276 U1 | 7/2004 |
| DE | 20 2004 009 329 U1 | 12/2004 |
| EP | 0 190 604 A2 | 8/1986 |
| EP | 0 738 080 A1 | 10/1996 |
| EP | 0 774 616 A2 | 5/1997 |
| EP | 1 297 781 A1 | 4/2003 |
| EP | 1 577 613 A2 | 9/2005 |
| GB | 2 362 207 A | 11/2001 |
| JP | 11-176220 | 7/1999 |
| WO | WO 91/02194 | 2/1991 |

* cited by examiner

*Primary Examiner*—Sandra L O'Shea
*Assistant Examiner*—Leah S Lovell
(74) *Attorney, Agent, or Firm*—Oblon, Spivak, McClelland, Maier & Neustadt, L.L.P.

(57) ABSTRACT

The present invention discloses an illumination device for illuminating users of a multimedia communication terminal. In particular, the illumination device includes high power white LEDs together with a reflector and a diffuser integrated in, or connected to, the terminal. Preferably, the light intensity and the position and angle relative to the terminal are controllable through a user interface.

9 Claims, 2 Drawing Sheets

ILLUMINATION DEVICE

FIELD OF INVENTION

The present invention discloses a illumination assembly for use in a multimedia communication terminal.

TECHNICAL BACKGROUND

In order to have a meeting involving participants not located in the same area, a number of technological systems are available. These systems may include video conferencing, web conferencing and audio conferencing.

The most realistic substitute for real meetings is high-end video conferencing systems. Conventional video conferencing systems comprise a number of endpoints communicating real-time video, audio and/or data streams over WAN, LAN and/or circuit switched networks. The endpoints include one or more monitors, cameras, microphones and/or data capture devices and a codec, which encodes and decodes outgoing and incoming streams, respectively. In addition, a centralized source, known as a Multipoint Control Unit (MCU), is needed to link the multiple end-points together. The MCU performs this linking by receiving the multimedia signals (audio, video and/or data) from endpoint terminals over point-to-point connections, processing the received signals, and retransmitting the processed signals to selected endpoint terminals in the conference.

Video conference systems are used throughout the business community for point to point audio and visual communication between individuals. The users of video conferencing may sit in workplace environments such as personal office or cubical, small or large meeting rooms or board rooms. They may also sit in other types of environments such as school classroom, auditoriums, prison visitation rooms, or public areas such as airports, train stations, libraries, hotel lobby, manufacturing plants etc. Portable self contained systems have been developed enabling users to communicate from e.g. desert expeditions, mountain climbing, oil platforms, etc. In essence a video conferencing system may be in use in any inside or outside environment anywhere in the world.

Hence, video conferencing systems operate in many cases under widely varying lighting conditions, ranging from office environments with fluorescent ceiling lights and halogen lamps to a partly or fully outdoor environment with strong exposure to natural sunlight. The performance of most if not all face recognition systems is strongly affected by many environmental lighting conditions.

The light intensity can vary from weak and diffuse to high intensity spot. In most of the usage scenarios the user is not able to adjust the lighting; rooms will have permanently fitted ceiling lights, windows allowing daylight, etc. Small adjustments may be possible through the use of curtains or blinds, turning on or off ceiling lights etc, but in most situations the user has to accept the conditions as they are.

Also, changing the position and orientation of the capture device (that is, a camera) usually affects the recorded illumination of the subject. Furthermore, environments affected by sunlight will have different lighting conditions at different times of the day.

The enormous variation is ambient lighting results in the video conference user being illuminated in a variety of ways, only some of which are suitable for a high quality video conference. Extreme situations may result in the user being backlit with strong sunshine which even although damped by blinds or curtains may still give a silhouette appearance to the other video conference users. This will result in the other users of the video conference communicating with a silhouette instead of a visible person.

A common bad lighting situation in a video conference appears when the participants are using personal desktop video conferencing endpoints in office environments. In these cases, the camera is typically localized relatively closed to the user's face, normally on top of the desktop endpoint. In office environments, strong fluorescent lighting from above typically creates shadows in the user's face making a distorted and blurred face image.

A general advantages of video conferencing compared to audio conferencing is that it allows for exchange of expressions just as in real face-to-face communication. This advantage could be completely spoiled when the face lighting is bad.

This is particularly important in cases of use in the judicial system is it vital that the judge, prison guard or arresting officer can evaluate the prisoners' sobriety and general condition by looking at his facial features, reactions and expressions. The prisoners' facial features, contours, shadows under the eyes will all vary dramatically depending on the direction of the ambient lighting, given that it may come from ahead, behind, above or from the side.

Use of systems in outside applications, such as expeditions or emergency response services may easily result in the situation whereby a system is required to operate in low-light or no-light situation. In such conditions a portable video conferencing systems designed for outside rugged use will not be able to function.

One attempt to solve the above described problems is the Sightlight, developed by Griffin Technology for the Apple iSight (ref.: www.griffintechnology.com/products/sightlight/), which is a product providing a source of illumination to webcam users. The Sightlight is designed as a ring of LEDs mounted within an optical reflector formed as a circular ring that fits around the cylindrical body of the Apple iSight. The Sightlight has three switching modes, being on, off or auto adjust. The auto adjust is accomplished by use of a photo diode sensing the level of ambient brightness. The Sightlight is relatively weak in light power, only being able to illuminate a face when approximately 40 cm from the unit. Further away than 40 cm gives no change to the perceived illumination when viewed through the video conference system.

Another drawback of the Sightlight is the location of the light source, i.e. the location in a circular pattern around the camera. This results in the user looking at the screen with the light source mounted directly above the screen (for nearest possible eye-to-eye contact) and being distracted by the spotlight effect of the Sightlight. The optical lens only splits the light source from the LEDs into smaller refracted light beams, with no attempt being made to diffuse the light. The effect can be described as to being similar to looking into the beam of a torch.

The Sightlight is only controllable from the near-end of the web-cam system, i.e. it is controlled by the user that is being illuminated. It is not possible to remotely control the Sightlight from the far-end, i.e. from the users looking at the user being illuminated.

BRIEF DESCRIPTION OF THE OBJECT OF THE INVENTION

The present invention provides an illumination device for illuminating one or more users in front of a multimedia communication terminal comprising a gutter-shaped housing with a generally angular or U-shaped cross section consisting of a light reflecting material, a LED array including a number of light emitting diodes attached to the bottom of said gutter-shaped housing, and a diffuser sheet consisting of light diffusing, partly transparent material mounted on top of said gutter-shaped housing.

BRIEF DESCRIPTION OF THE DRAWINGS

The present invention will be described in detail with reference to a preferred embodiment as shown in the following drawings.

DETAILED DESCRIPTION OF THE INVENTION

In the following, the present invention will be discussed by describing a preferred embodiment, and by referring to the accompanying drawings. However, people skilled in the art will realize other applications and modifications within the scope of the invention as defined in the enclosed independent claims.

According to the present invention, high power white LEDs together with a reflector and diffuser integrated in the video conferencing endpoint provides the illumination of the participant(s) being capture by the camera of the endpoint.

The variation in the location of the video conference system and the variation in the quality of the ambient lighting drives the need for an integrated system which can illumine the users' face and torso. The illumination is preferably an auxiliary illumination, whereby its' purpose is to counteract the unwanted negative effects of the ambient illumination. In simple terms it should neutralise facial shadows and silhouettes when the user is strongly lit from the side, above or behind. In addition, it should provide lighting strong enough to perform a high quality video conference in situation where there is no or low lighting no matter the direction of the lighting source.

According to the present invention, the function of the LEDs is to provide a high intensity white light source, which at the same time consumes low power in relation to the intensity of the light. The intensity and spreading of the light from a LED requires the use of a reflector to collect and direct the light rays. The design of the reflector may be adjusted to suit the application the light will be used for, and can for example be such that a focused beam of light can be projected a certain distance, alternatively the reflector can spread the light over a wide area if required for short distance lighting.

Figure 1:
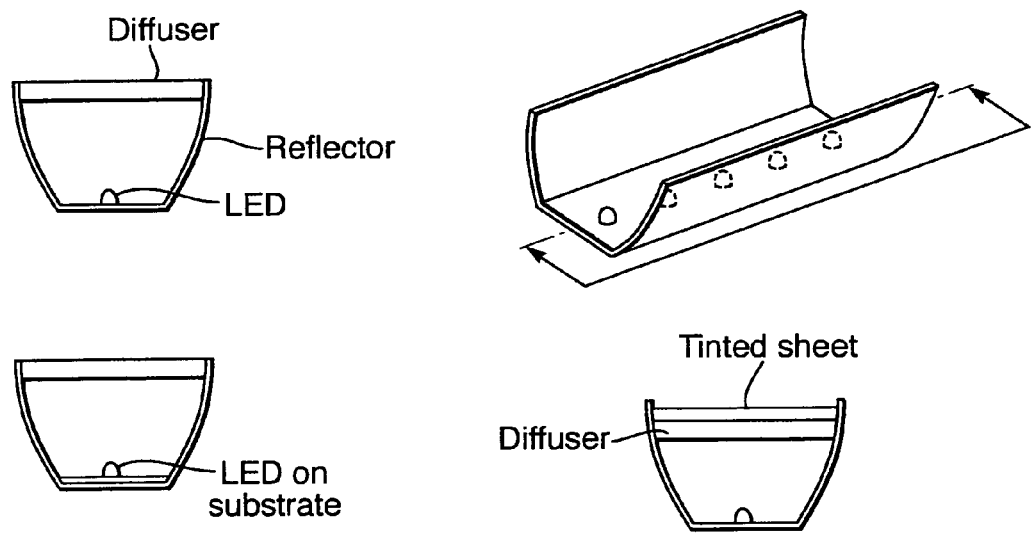
FIG. 1 illustrates an example of a LED lamp assembly according to the present invention.

FIG. 1 shows an overall picture of an assembly of LEDs, reflector and diffuser according to one embodiment of the present invention. A linear array of LEDs protected by a LED substrate is mounted on a back panel. A reflector is mounted edge to edge with the back plane on each side of the LED array in a gutter-like shape with the LED array in the bottom. The back plane and the reflector could of course also be made out of a same sheet folded along two lines to create two reflector wings. The reflector is preferably painted or coated on the internal surface with a white or silver colour. A diffuser is mounted on top of the gutter, together forming an oblong housing of the LED array.

Figure 2:
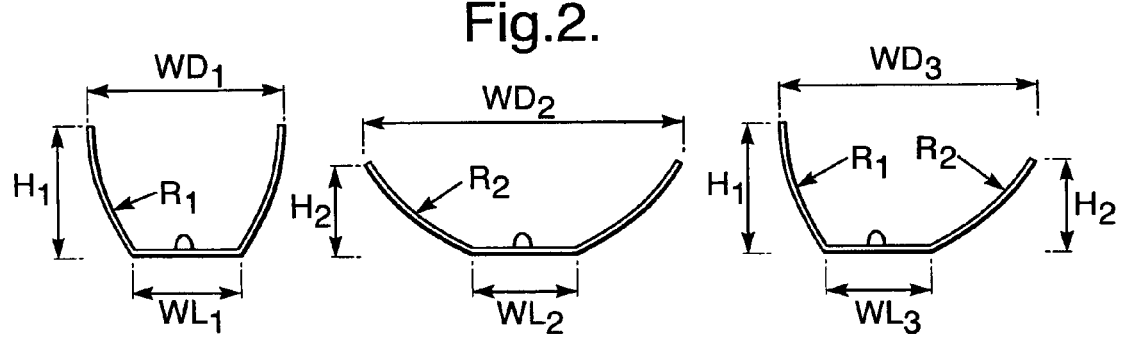
FIG. 2 shows cross-sectional views of LED lamp assemblies of various dimensions.

As already mentioned, the LED lamp assembly may have various designs. Key parameters in the design of the assembly are height from LED to diffuser (H), width of diffuser (WD), width of LED base (WL) and radius of reflector sides (R). As depicted in FIG. 2, the LED lamp assembly does not have to be symmetric, and can have different radii (R) and height (H) from side to side. The radii of the sides do not have to be of constant curvature.

Figure 3:
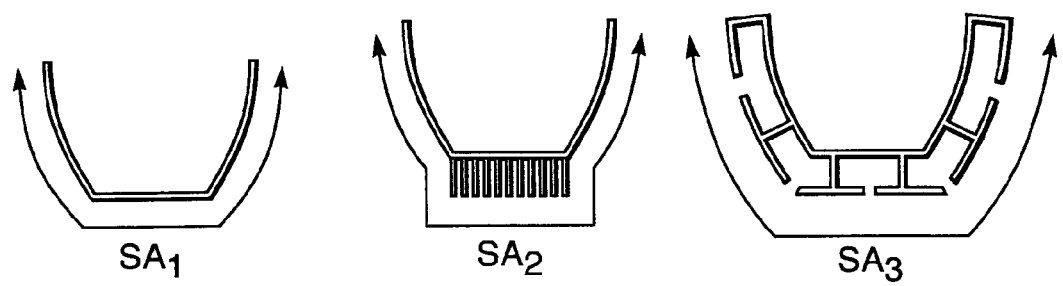
FIG. 3 shows cross-sectional views of LED lamp assemblies of various cooling methods.

For providing best possible reflection, the LED lamp assembly should preferably be made of a metal such as steel or aluminium. Thus, the surface area of the LED lamp assembly is crucial because the whole assembly will act as a heat sink for the high power LEDs. The LEDs demand a certain surface area (SA) per LED and the reflector can be designed such that this surface area is available per module length of the LED array. If required special features can be included in the design of the reflector to increase the surface area within a compact size. As indicated in FIG. 3, these features can include narrow ribs on the rear of the unit, i.e. the face away from the light source.

According to the present invention, the purpose of the diffuser is to gather the individual light rays from the reflectors and homogenise them into a large area constant intensity light. This allows the user to be directly spotlighted by the LED lamp without feeling any substantial discomfort. Without a diffuser the light rays will provide discomfort to the user, and potential short term focused spots in the eye. Viewing without a diffuser can be compared to looking directly into a power flashlight or into the main lights of a car.

The effect of the diffuser is directly related to the distance (H) from the LED source. If H is small, then the diffuser will not receive a properly reflected beam and this will result in a weak general light together with a strong central white spot. If H is large, then the diffuser will receive a widely dispersed beam falling in intensity due to distance from the source, and the diffuser will therefore absorb a large portion of the light energy instead of homogenising and allowing to pass through.

A typical example of materials in the diffuser can be acrylic sheets with the appearance of white frosted glass, being especially effective if one side is matt and the other side is gloss. Other colour and material combinations are also possible. A separate semi-transparent sheet on the outside of the diffuser, for example in a slightly tinted material, gives the opportunity to blend the LED lamp into the general overall design of the video conference system. If the tint is weak, then the detrimental effects to the light colour and intensity when active are small compared to the visual effects when inactive. The thickness of the diffuser (T) has an effect on the light transmission performance. The greater the thickness the less light is transmitted.

The various parameters (R, T, H, WD, WL) in the design of the reflectors and diffuser coupled together with the power output of the LED means that a range of system performance can be achieved and tailored to each specific application.

Figure 4:
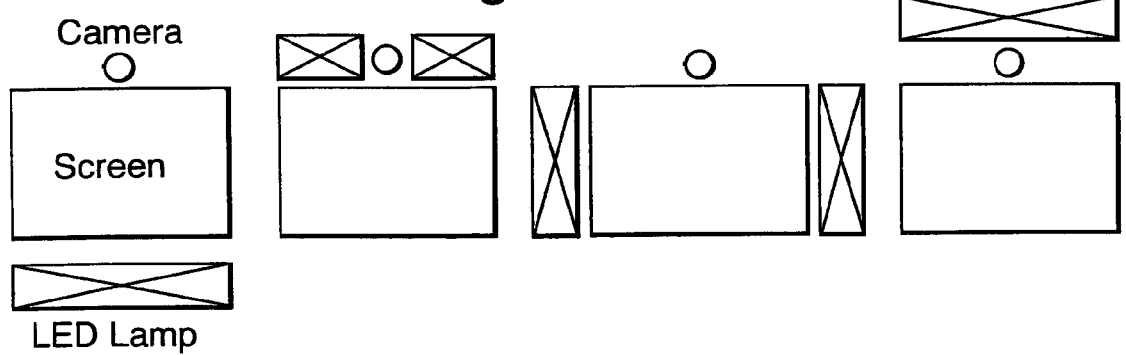
FIG. 4 shows alternative placements of the LED lamp assembly relative to the screen and camera of a multimedia communication terminal.

The position of the LED lamp assembly can be made to best suit the layout of the video conference system into which it is integrated. A typical video conference system will have requirements for modules such as screen, camera, microphone, loudspeakers and user interface. In FIG. 4, various placing of the LED lamp assembly is shown. The LED lamp is placed over, under or on each side of the screen. In all cases the lightening will according to the intention due to the fact that the user will be looking into the screen during the video conference, and therefore a LED lamp placed in the vicinity of the screen and directed towards the user will illuminate the users face.

However, the most preferred placement of the LED lamp should be above the screen and either on each side of the camera or above the camera. Placement underneath the screen will result in an illusion for the user that the screen has become darker, since the user's natural eye direction is from the horizontal and downwards.

In addition to a fully integrated LED lamp assembly it is also possible to design the lamp such that it becomes a separate unit from the actual video conference system. A separate lamp unit may be applicable for large systems in large rooms, whereby the lamps could become satellites placed in the room to ensure even lighting to all video conference users. The position of the satellite units could be in the middle of a table pointing outwards, ceiling mounted directed to the users face, wall mounted or floor standing.

The LED array can be connected to a power source controlled by the video conference system. This is applicable both in the case of a fully integrated system but also in the case of a satellite system. Connection to a controlled power source means that the lamp can be made to only be active when the video conference system itself is in use. This differentiates the LED illumination from the ambient illumination in the room or area. Furthermore, connection to a video conference controlled power source gives the opportunity to control the lighting from the far-end, i.e. from the users at the opposite end of the video call. The far-end users may wish to switch on/off or alter the dimming (i.e. the power output) of the LED lamp.

In one embodiment of the present invention, the light intensity and direction is adjustable for allowing the users to achieve the most optimal illumination in the user's environment. The LED lamp assembly angle relative to the video conference system, and the LED lamp assembly itself, will then have to be adjustable in both vertical and horizontal direction, either manually or automatically by a motor drive controlled in the same way as for control of the camera direction in conventional video conference endpoints. The light intensity will be adjusted by varying the power supply of the LED lamp assembly. This could be done from a user interface like a remote control or via a user menu. This will allow a user at the near-end to adjust the illumination of the face of the user at the near-end by changing the light intensity, position or angle of the LED lamp assembly with a remote control or a user interface.

One of the main advantages of the present invention is that the design of the reflectors can be shaped and adjusted in the parameters of height from LED (H), width of diffuser opening (WD) and radius of sides (R) such that the beam collation and projection can be tailored to each specific application. The reflector can be made of a metal such that is will function as a heat sink and therefore allow prolonged use of high power LEDs.

Further, the design and shape of the reflectors can be made such that the surface area (SA) required pr length of LED is included within the design. The LED lamp is not directly linked to the camera, and can therefore be positioned in a variety of positions around the screen on a fully integrated system, or can be placed in a variety of positions around a meeting room. The diffuser homogenises the point light source such that discomfort from glare is avoided whilst still allowing a high percentage of light transmission.

Note that even if the present invention is described in connection with conventional videoconferencing, it is applicable to any visual communication with a image capturing device is involved, i.e. the LED lamp assembly described herein could be connected to any multimedia communication terminal like a PC, a portable communication device, etc.

The invention claimed is:

1. An illumination device for illuminating one or more users in front of a multimedia communication terminal, comprising:
   a LED lamp assembly, comprising:
      a gutter-shaped housing with a generally angular or U-shaped cross section including a light reflecting material on an interior of a bottom member of the gutter-shaped housing,
      a LED array including a number of light emitting diodes attached to the interior of the bottom member of said gutter-shaped housing, and
      a diffuser sheet including a light diffusing, partly transparent material disposed on top of said gutter-shaped housing; and
   a user interface allows for control adjustment of a light intensity of at least one of the light emitting diodes and for control adjustment of a position or angle of the LED lamp assembly relative to the multimedia communication terminal, the user interface including a menu system, wherein
   said illumination device is configured to be attached under, above or on a side of the multimedia communication terminal by one or more retaining devices, and
   said LED array is configured to be electrically coupled to a power source controlled by the multimedia communication terminal.

2. The illumination device according to claim 1, wherein said user interface allows for control adjustment of the position or the angle relative to the multimedia communication terminal by controlling a movement of the one or more retaining devices.

3. The illumination device according to claim 1 or 2, further comprising:
   one or more narrow ribs being attached on a backside of the illumination device and configured to cool down LED array generated heat.

4. The illumination device according to claim 1 or 2, wherein said gutter-shaped housing is made of steel or aluminium.

5. The illumination device according to claim 1 or 2, wherein an internal surface of said gutter-shaped housing includes a white or silver colored layer.

6. The illumination device according to claim 1 or 2, wherein said diffuser sheet has a matt finish on a face outward from the gutter-shaped housing and a gloss finish on a face inward toward the gutter-shaped housing.

7. A system comprising:
   a LED lamp assembly including a gutter-shaped housing with a generally angular or U-shaped cross section including a light reflecting material, a LED array including a number of light emitting diodes attached to a bottom of said gutter-shaped housing, and a diffuser sheet including a light diffusing, partly transparent material disposed on top of said gutter-shaped housing;
   a multimedia communication terminal configured to transmit signals through a network;
   a retaining device configured to attach the illuminating device to the multimedia communication terminal; and
   a user interface allows for control adjustment of a light intensity of at least one of the light emitting diodes and for control adjustment of a position or angle of the LED lamp assembly relative to the multimedia communication terminal, the user interface including a menu system, wherein said LED array is configured to be electrically coupled to a power source controlled by the multimedia communication terminal.

8. The system of claim 7, wherein the LED lamp assembly the illuminating device is configured to be detachable from the multimedia communication terminal while still being electrically coupled to the multimedia communication terminal.

9. A system comprising:
a LED lamp assembly including a LED array;
a first multimedia communication terminal configured to transmit signals through a network;
a retaining device configured to attach the illuminating device to the multimedia communication terminal; and
a communications interface configured to receive a command through the network from a remote second multimedia communication terminal to adjust a light intensity of at least one of the light emitting diodes or to adjust a position or angle of the LED lamp assembly relative to the multimedia communication terminal.

* * * * *